UNITED STATES PATENT OFFICE.

ALBERT L. MARSH, OF DETROIT, MICHIGAN, ASSIGNOR TO HOSKINS MANUFACTURING COMPANY, OF DETROIT, MICHIGAN, A CORPORATION OF MICHIGAN.

THERMO-ELECTRIC COUPLE.

971,767. Specification of Letters Patent. Patented Oct. 4, 1910.

No Drawing. Application filed September 3, 1909. Serial No. 516,078.

*To all whom it may concern:*

Be it known that I, ALBERT L. MARSH, a citizen of the United States, residing at Detroit, in the county of Wayne and State of Michigan, have invented a new and useful Improvement in Thermo-Electric Couples, of which the following is a specification.

My object is to provide a thermo-electric couple of improved construction possessing a particularly high electro-motive force and melting point and giving a practically straight line electro-motive force-temperature curve with attendant advantages.

A nickel-copper alloy (positive) element used in conjunction with a nickel-chromium alloy (negative) element will give a practically straight line electro-motive force-temperature curve, but its melting point is too low to permit its use for measuring temperatures, say, much above 1000° C.

It is to be understood that by positive element is herein meant the element, in a couple, from which the electric current flows to the other, or negative, element through the junction of the couple which is subjected to heat.

I have discovered that by using in a thermo-electric couple a certain nickel-aluminum alloy for the positive element and, more especially, a nickel-chromium (Cr 10%) alloy for the negative element, I obtain the followink advantages: particularly high electro-motive force; a particularly high melting point; and a comparatively straight line electro-motive force-temperature curve indicating no critical points in the elements. The said metal alloys are further desirable because of the fact that they may be readily rolled or drawn into rods or wire.

It may be stated, for example, that pure nickel has an electro-motive force of approximately 28 millivolts when used with copper as the negative element, and when the hot junction of the couple is at the melting point of copper and the cold end of the couple is at a temperature approximately 25° C. If instead of employing nickel alone as the positive element, say 3% of aluminum is mixed therewith to produce a nickel-aluminum alloy, still employing copper as the negative element, an electro-motive force, under the same conditions, of about 34 millivolts is produced which, as will be seen, is an increase of about 21% in the electro-motive force. I prefer to use my nickel-aluminum alloy as the positive element in a couple employing a nickel-chromium (Cr 10%) alloy negative element, and practically the same proportionate advantage is obtained in such a couple as in the above-described case of a nickel-aluminum and copper couple.

I find in the use of a thermo-electric couple having a nickel-chromium (Cr 10%) negative element and a nickel-aluminum positive element, that by forming the positive element of an alloy containing, say, only 2% of aluminum instead of 3% I lower to a very slight degree the electro-motive force of the couple, but render more straight the electro-motive force-temperature curve; in fact, in the use of this couple the electro-motive force-temperature curve is for all practical purposes straight.

It may be stated, for example, that a couple consisting of pure nickel as a positive element and a nickel-chromium alloy negative element (containing approximately 10% chromium) does not give a straight line electro-motive force-temperature curve throughout a range of temperature of between 25° C. and 1400° C., the latter being the practical limit of temperature that the couple will measure. A potentiometer will indicate a decided bend in the electro-motive force-temperature curve at a little below 300° C. When, in a thermo-electric couple employing the same negative element, the pure nickel is replaced with a nickel-aluminum alloy in the formation of which 5% aluminum has been added to the nickel, the electro-motive force-temperature curve has a decided bend at approximately a little below 300° C., the same as in the other couple mentioned but in the opposite direction. I may state that I have found in practice that a thermo-electric couple employing a nickel-chromium alloy (10% Cr) as the negative element and a nickel-aluminum alloy (aluminum 2%) as the positive element, gives a practically straight line electro-motive force-temperature curve throughout the temperature range of from 25° C. to 1400° C., thereby indicating that such a couple has no critical points in the temperature range mentioned.

What I claim as new and desire to secure by Letters Patent, is:

1. In a thermo-electric couple, a positive element formed of an alloy containing a relatively small proportion of aluminum and a metal having the properties of nickel, in such alloy, of obtaining in coöperation with a nickel-chromium negative element, high electromotive force, a high melting point and a comparatively straight line electromotive force-temperature curve.

2. In a thermo-electric couple, a positive element formed of an alloy containing less than 10% of aluminum and a metal having the properties of nickel, in such alloy, of obtaining in coöperation with a nickel-chromium negative element, high electromotive force, a high melting point and a comparatively straight line electromotive force-temperature curve.

3. A thermo-electric couple having a negative element formed of a nickel-chromium alloy and a positive element formed of an alloy containing nickel and a relatively small proportion of aluminum.

4. In a thermo-electric couple, an electropositive element formed of an alloy containing nickel and approximately 2% of aluminum.

ALBERT L. MARSH.

In presence of—
AUSTIN G. MELCHER,
WM. W. TALMAN.